2 Sheets—Sheet 1.

W. M. SLOANE.
Carbureter for Car.

No. 210,717.      Patented Dec. 10, 1878.

ATTEST:
Arthur C. Fraser.
Thomas J. Kingham

INVENTOR:
William M. Sloane
Per Burke & Fraser
Attys.

2 Sheets—Sheet 2.

W. M. SLOANE.
Carbureter for Car.

No. 210,717. Patented Dec. 10, 1878.

ATTEST:
Arthur C. Fraser.
Thomas J. Kirkham

INVENTOR:
William M. Sloane
Per
Burke & Fraser

UNITED STATES PATENT OFFICE.

WILLIAM M. SLOANE, OF NEW YORK, N. Y., ASSIGNOR TO DANIEL H. BURTNETT, OF SAME PLACE.

IMPROVEMENT IN CARBURETERS FOR CARS.

Specification forming part of Letters Patent No. 210,717, dated December 10, 1878; application filed November 23, 1878.

*To all whom it may concern:*

Be it known that I, WILLIAM M. SLOANE, of the city, county, and State of New York, (assignor to myself, WILLIAM A. HODGES, and ROBERT B. CARSLEY, all of the same place,) have made certain Improvements in Carbureters for Cars, &c., of which the following is a specification:

This invention relates to an apparatus for carbureting air or saturating it with the vapor of some volatile hydrocarbon, the said apparatus being adapted to and arranged for illuminating railway-cars or similar structures.

The invention consists, partially, in the combination of a shell with cages made entirely of foraminous material and packed with absorbent material, the same being alternately of greater and less diameter, those of the greater having central openings, whereby circulating-passages are formed alternately at the center and around the circumference.

It also consists in covering the outlet of the drip-cock with a foraminous cone, embedded in the packing of the lower cage, all as will be hereinafter described, and particularly set forth in the claims.

Figure 1:
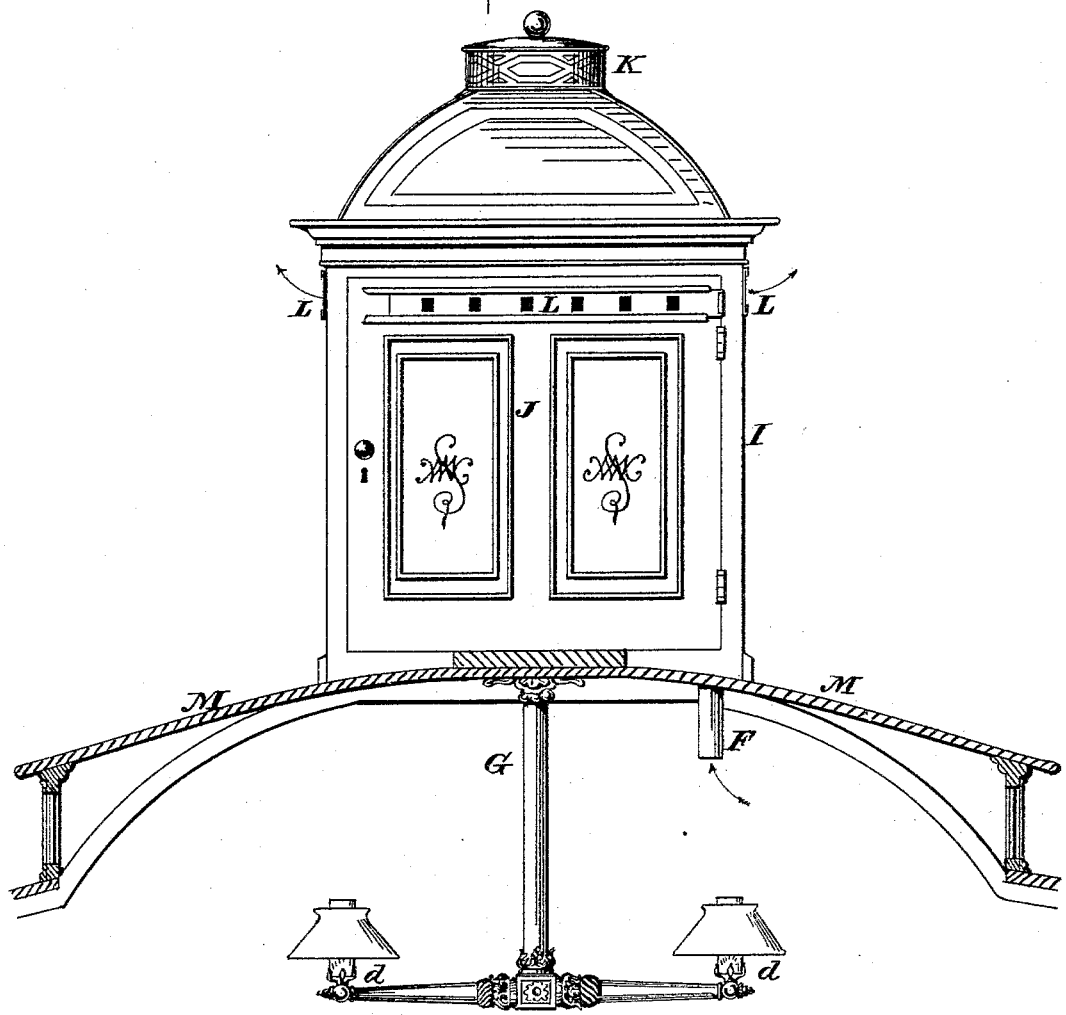
Figure 2:
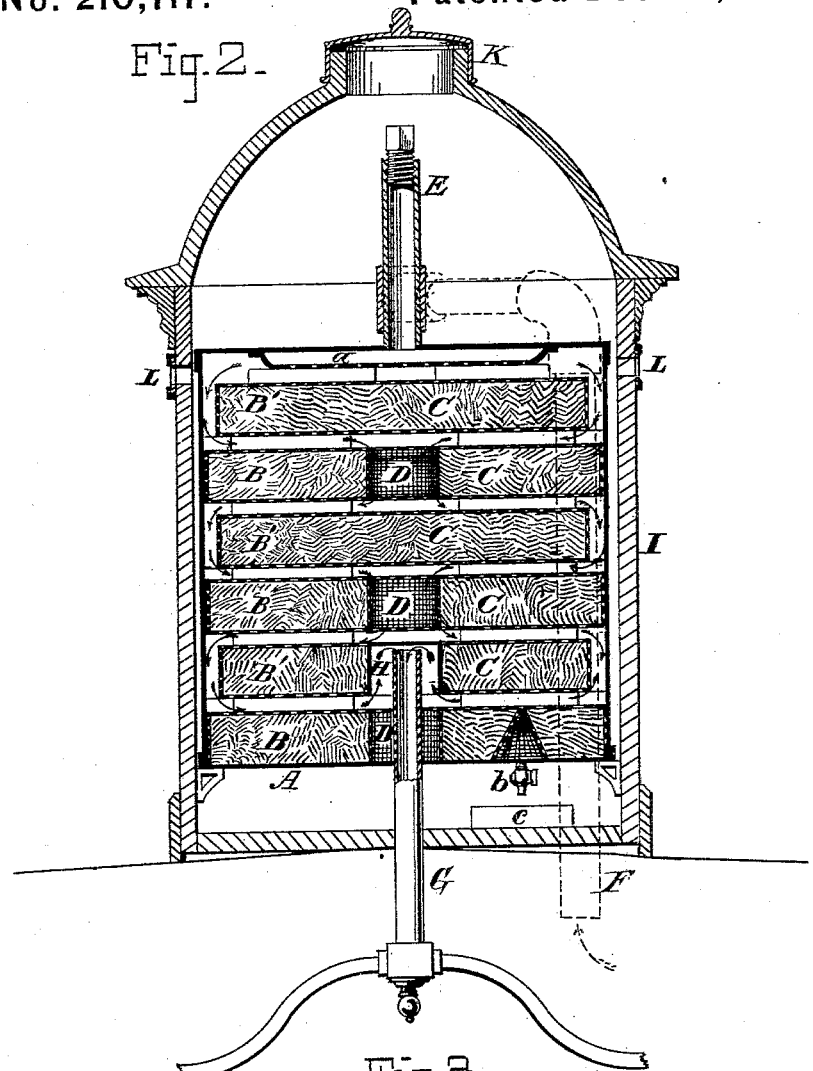
Figure 3:
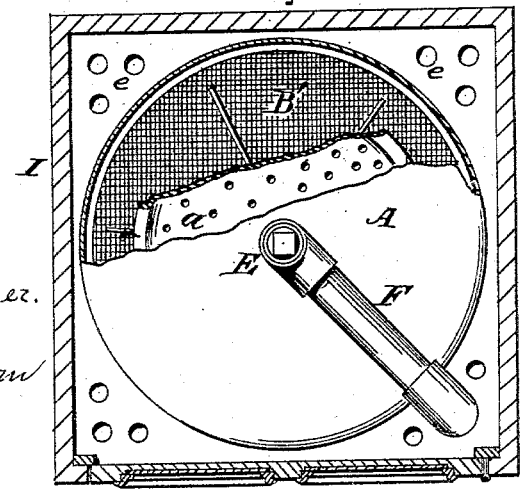

In the drawings, Figure 1 is a general view of my carbureting apparatus as applied to a car. Fig. 2 is a vertical central section of the carbureter and its inclosing-cabinet. Fig. 3 is a top view with the cap of the cabinet removed and a portion of the carbureting-vessel broken away to show the interior.

A represents the shell of the carbureter. This vessel may be of light boiler-iron, and be cylindrical in form, as shown. This form is not absolutely essential, but I prefer it for use on cars, as being strong and convenient.

B B' are closed cages, made of wire-gauze or other equivalent foraminous material, and packed with some flexible, porous, or absorbent material, C. This may be pumice-stone, asbestus, or any substance of a like nature, that which is refractory or non-combustible being preferred.

The cages B B' are arranged in alternate order, beginning with B at the bottom and ending, preferably, with B' at the top. The cages B B extend to the walls of the vessel A on every side, but have gauze-walled central apertures D D. The gauze of the top and bottom of the cages extends across these apertures, as shown. The cages B' B' are a little less in diameter than the containing-vessel, leaving peripheral passages all around them, and are fixed in position by studs or projections, as shown. The cages are packed one on top of another, being kept separate by means of narrow radial ribs between them, or by some equivalent device.

Attached to the under side of the cover of the vessel A is a distributing-plate, *a*, made of some perforated material, and arranged to cover the mouth of the filling-pipe E. F is the air-inlet pipe, which passes up through the roof of the car alongside of the vessel A, and taps the pipe E, as shown. When the lights are extinguished, the lower end of this pipe should be closed.

G is the gas-delivery pipe. The air entering the vessel through the pipes E and F falls by gravity, and assumes, of necessity, the tortuous course indicated by the arrows before it can reach the pipe G and escape to the burners *d d*.

The carbureter is charged by pouring a volatile hydrocarbon—as gasoline—into the pipe E, whence it passes through the distributing-plate *a* onto the cages B' B, and is absorbed by them to the point of saturation. After the porous material will absorb no more, the fluid makes its appearance at the drip-cock *b*. This cock is protected from clogging up by a cone, of gauze or other similar material, formed in the lower cage, and is provided with a drip pan or vessel, *c*.

If the drip-cock should become clogged, no warning would be given of supersaturation, and the fluid would be likely to overflow into the pipe G and flood the burners. This is effectually avoided by extending the said pipe up into the second cage from the bottom and arranging over its extremity an inverted cup, H. This serves as a seal or valve to shut off the escaping gas when the fluid rises in the vessel A to a point above the open mouth of the inverted cup, and the lights will, of course, be extinguished before any overflow can take place.

The carbureting-vessel A, with its attachments, is inclosed within a cabinet, I, mounted on the top of the car, substantially as in Fig. 1. This cabinet has a door, J, a removable cap or cover, K, and openings at the sides, regulated by sliding dampers L L. These openings, in conjunction with openings e e (see Fig. 3) in the bottom of the cabinet, and communicating with the interior of the car, serve to permit a current of warm air from the car to pass up around the vessel A, and thus keep its contents at the proper temperature in cold weather. In summer this may serve as a ventilator for the car.

M represents the roof, or a portion of the roof, of a railroad-car, in which or on which the carbureter is mounted at a point above the burners.

I claim—

1. In a carbureter, the combination of the shell A, the cages B B', made entirely of foraminous material, packed with absorbent material, and alternately of greater and less diameter, those of the greater having central openings D, whereby circulating-passages are formed alternately at the center and around the circumference, substantially as described.

2. In a carbureter, the lower cage, B, having a foraminous cone fixed therein, and surrounded by the absorbent packing C, in combination with the trip-cock b, as and for the purpose set forth.

In witness whereof I have hereunto signed my name in the presence of two subscribing witnesses.

WILLIAM M. SLOANE.

Witnesses:
SAM. TRO. SMITH,
HENRY CONNETT.